US012337827B2

(12) United States Patent
Prinzhausen et al.

(10) Patent No.: US 12,337,827 B2
(45) Date of Patent: Jun. 24, 2025

(54) METHOD FOR TRAINING A TRAJECTORY FOR A VEHICLE, AND ELECTRONIC VEHICLE GUIDANCE SYSTEM

(71) Applicant: Valeo Schalter und Sensoren GmbH, Bietigheim-Bissingen (DE)

(72) Inventors: Stefanie Prinzhausen, Bietigheim-Bissingen (DE); Stefan Ewald, Bietigheim-Bissingen (DE)

(73) Assignee: VALEO SCHALTER UND SENSOREN GMBH, Bietgheim-Bissingen (DE)

( * ) Notice: Subject to any disclaimer, the term of this patent is extended or adjusted under 35 U.S.C. 154(b) by 525 days.

(21) Appl. No.: 17/423,739

(22) PCT Filed: Dec. 16, 2019

(86) PCT No.: PCT/EP2019/085313
§ 371 (c)(1),
(2) Date: Jul. 16, 2021

(87) PCT Pub. No.: WO2020/148047
PCT Pub. Date: Jul. 23, 2020

(65) Prior Publication Data
US 2022/0063599 A1    Mar. 3, 2022

(30) Foreign Application Priority Data

Jan. 16, 2019    (DE) .................... 10 2019 101 040.3

(51) Int. Cl.
*B60W 30/06*    (2006.01)
*B60W 30/14*    (2006.01)
*B60W 40/02*    (2006.01)

(52) U.S. Cl.
CPC .......... *B60W 30/06* (2013.01); *B60W 30/143* (2013.01); *B60W 40/02* (2013.01); *B60W 2420/40* (2013.01); *B60W 2420/408* (2024.01)

(58) Field of Classification Search
None
See application file for complete search history.

(56) References Cited

U.S. PATENT DOCUMENTS

| | | | |
|---|---|---|---|
| 2003/0154014 A1* | 8/2003 | Iwata | B60W 10/184 123/352 |
| 2013/0032421 A1* | 2/2013 | Bonne | B60W 50/14 180/204 |

(Continued)

FOREIGN PATENT DOCUMENTS

| | | |
|---|---|---|
| DE | 102004047130 B4 | 7/2012 |
| DE | 102011107974 A1 | 1/2013 |

(Continued)

OTHER PUBLICATIONS

International Search Report and Written Opinion in corresponding International Application No. PCT/EP2019/085313, mailed Mar. 11, 2020 (20 pages).

(Continued)

*Primary Examiner* — David P. Merlino
(74) *Attorney, Agent, or Firm* — Osha Bergman Watanabe & Burton LLP

(57) ABSTRACT

One aspect relates to a method for training a trajectory (12) for a vehicle (3), along which the vehicle (3) drives into a parking area (P), wherein, during a training drive, the environment (11) of the vehicle (3) is captured using a first capture device (7, 8, 9) of the vehicle (3), which first capture device constitutes a first type of function with respect to the type of capture and/or a capture state and/or the position on the vehicle and/or the orientation on the vehicle (3), and the trajectory (12) is determined on the basis thereof, wherein, (Continued)

during a subsequent drive which follows the training drive and in which the vehicle (3) drives to the parking area (P) at least in certain regions, the environment (11) is captured using a second capture device (7, 8, 9) of the vehicle (3), which second capture device constitutes a second type of function differing from the first type of function with respect to the type of capture and/or a capture state and/or the position on the vehicle (3) and/or the orientation on the vehicle (3), wherein the trajectory (12) is updated on the basis of the information captured by the second capture device (7, 8, 9). A further aspect relates to an electronic vehicle guidance system (5).

7 Claims, 1 Drawing Sheet

(56) References Cited

U.S. PATENT DOCUMENTS

| | | |
|---|---|---|
| 2013/0035821 A1 | 2/2013 | Bonne et al. |
| 2017/0052249 A1* | 2/2017 | Bartsch ............ B60W 50/04 |
| 2018/0164773 A1 | 6/2018 | Wang et al. |
| 2018/0203461 A1* | 7/2018 | Yokokawa ............ G06V 20/58 |
| 2019/0072974 A1* | 3/2019 | Hwang ............ G05D 1/0278 |
| 2019/0184981 A1* | 6/2019 | Jung ............ B60W 30/095 |
| 2020/0017099 A1 | 1/2020 | Yamaguchi et al. |
| 2021/0284183 A1* | 9/2021 | Marenco ............ B60W 50/06 |

FOREIGN PATENT DOCUMENTS

| | | |
|---|---|---|
| DE | 102011109491 A1 | 2/2013 |
| DE | 102012220052 A1 | 10/2013 |
| DE | 102013015349 A1 | 4/2014 |
| DE | 102013213225 A1 | 1/2015 |
| DE | 102014018192 A1 | 6/2015 |
| DE | 102014218429 A1 | 3/2016 |
| DE | 102015210357 A1 | 12/2016 |
| DE | 102015215679 A1 | 2/2017 |
| DE | 102016217330 A1 | 3/2018 |
| DE | 102016225772 A1 | 6/2018 |
| DE | 102017119236 A1 | 2/2019 |
| DE | 102018113344 A1 | 12/2019 |
| JP | 2002-094978 A | 3/2002 |
| JP | 2002-099907 A | 4/2002 |
| JP | 2007-290712 A | 11/2007 |
| JP | 2010-230139 A | 10/2010 |
| JP | 2016-156973 A | 9/2016 |
| JP | 2018-075890 A | 5/2018 |
| JP | 2018-094677 A | 6/2018 |
| WO | 2018/070021 A1 | 4/2018 |

OTHER PUBLICATIONS

German Search Report issued in corresponding German Application No. 10 2019 101 040.3, dated Sep. 20, 2019 (6 pages).
Notice of Preliminary Rejection in corresponding Korean Application No. 2021-7022613, dated Feb. 2, 2023 (15 pages).
Notification of Reason for Rejection issued in corresponding Japanese Patent Application No. 2021-541065, mailed on Nov. 4, 2022 (31 pages).

* cited by examiner

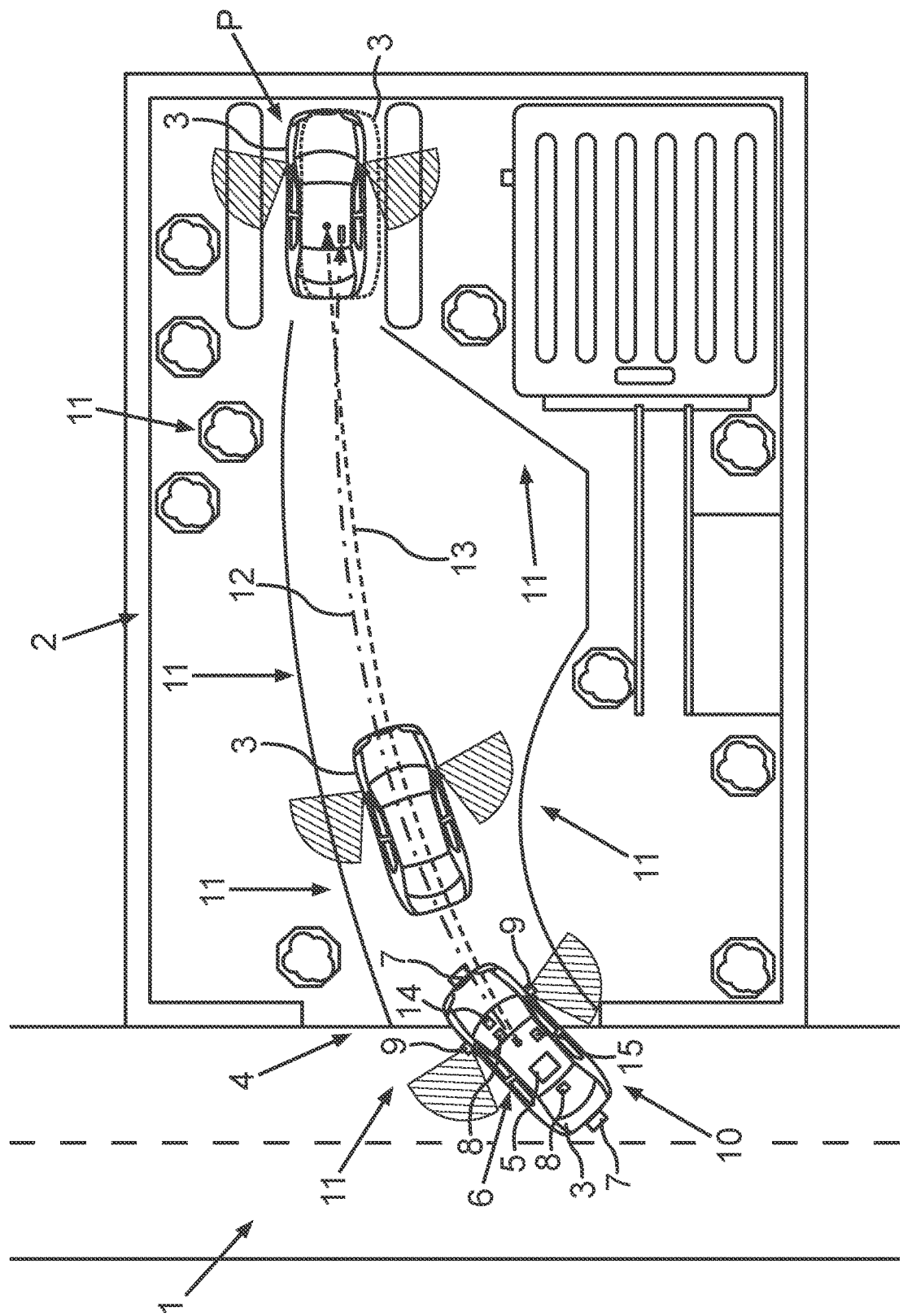

METHOD FOR TRAINING A TRAJECTORY FOR A VEHICLE, AND ELECTRONIC VEHICLE GUIDANCE SYSTEM

One aspect of the invention relates to a method for training a trajectory for a vehicle, along which the vehicle drives into a parking area. During a training drive, the environment of the vehicle is captured using a first capture device of the vehicle. The trajectory is determined on the basis thereof. A further aspect of the invention relates to an electronic vehicle guidance system for a vehicle.

DE 10 2004 047 130 B4 discloses a method for orienting a dynamic variable environment of autonomous mobile systems such as a self-steering vehicle. In order to capture and model the dynamically variable environment during the drive, data relating to existing environmental elements are captured using sensors. The sensors may be laser systems, ultrasonic systems, radar systems and camera systems. If world model data are already available in advance, this information can be used as an initial basis, on which the further updating and specification are then carried out. For environment capture and modelling, the mobile system starts from any desired starting point to a predefined destination along a first free route which is detected, for example, by the sensors provided for this purpose, as mentioned. Alternatively, in a training drive, the mobile system can also be controlled by a driver or can drive along only predefined trajectories, with the result that local route planning is practically dispensed with and only the further process steps for environment capture and modelling must be carried out. In the known method, the different sensors are therefore used extensively in the respective scenarios, but this results in information relating to the environment being able to be obtained to a limited extent or in unsuitable information being available on account of the different types of functions of these sensors. This substantially impairs the training scenario. Since different types of functions of these sensors are subject to different functional scenarios, the blanket use of such versatile different sensors can provide only a result with limited suitability with respect to information for the training scenario.

In addition, DE 10 2013 015 349 A1 discloses a self-learning method in which, after repeatedly parking in the same region or an area, this area is defined as a home parking area. When approaching this home parking area, suitable information, such as determined driving data or captured environmental data such as steering/yaw angle, vehicle speed, GPS data and the trajectory driven along, is stored and already stored driving data or environmental data are updated, with the result that the method can be retrained. A captured trajectory driven along, an estimated trajectory which is likely to be driven along or data from the environmental sensors, such as camera images, ultrasonic measurements, is/are also stored or updated as environmental data. In this case too, different capture devices disregard the training scenario with respect to the information to be individually used.

The object of the present invention is to provide a method for training a trajectory for a vehicle, in which the information captured and made available by different capture devices is used in a manner more in line with requirements. In addition, the object is also to provide a corresponding electronic vehicle guidance system for a vehicle.

The object is achieved by means of a method and an electronic vehicle guidance system according to the independent claims.

One aspect of the invention relates to a method for training a trajectory for a vehicle, along which the vehicle drives into a parking area. During a training drive, the environment of the vehicle is captured using a first capture device of the vehicle. The first capture device constitutes a first type of function with respect to a type of capture and/or a capture state of the capture device and/or the position of the capture device on the vehicle and/or the orientation of the capture region of the capture device on the vehicle. The trajectory is determined on the basis of the information captured by the first capture device. It can be taken as a basis for subsequently driving the vehicle into the parking area.

During a subsequent drive of the vehicle which follows the training drive and in which the vehicle drives to at least certain regions of the parking area, the environment of the vehicle is captured using a second capture device of the vehicle, which second capture device constitutes a second type of function differing from the first type of function with respect to the type of capture and/or a captured state and/or a position on the vehicle and/or an orientation of the capture region of the second capture device on the vehicle. The trajectory is updated at least on the basis of the information captured by the second capture device during the at least one subsequent drive. As a result of this training scenario, different information from different capture devices is taken as a basis during different drives, namely the training drive, on the one hand, and the at least one subsequent drive, on the other hand, which differs from the training drive and follows it in terms of time, in order to then assess whether it is necessary to update and therefore also correct the trajectory. Since different types of functions of capture devices have different suitability with respect to the capture in different conditions, this aspect is taken into account here. The training scenario is improved hereby and it is possible to determine an optimum trajectory in a more accurate and faster manner.

In particular, it is therefore possible to take a localization method as a basis during trained parking in order to determine the exact position of the vehicle with respect to the scene and therefore with respect to the environment during the at least semi-autonomous driving. In particular, information from a previous training manoeuvre or a preceding training drive is used by virtue of this method and this training of the trajectory, which also constitutes localization of the vehicle with respect to the environment. This training drive can be carried out both manually and therefore completely under the control of the vehicle driver. However, it may also be carried out in an at least semi-autonomous manner. The subsequent drive can be carried out manually or in an at least semi-autonomous manner.

A capture device may be different in terms of the type of capture. In that context, an ultrasonic sensor or a radar sensor or an optical sensor, for example a lidar sensor or a camera, which are all capture devices with different types of functions in terms of the type of capture, can be mentioned, for example. With respect to the capture state, a situation in which the capture device is available for detection without restriction can be considered, for example. However, there may also be an at least partially restricted state; for example, there may be a coating, for example soiling or the like, on a lens of a camera or on a diaphragm of an ultrasonic sensor or on the radar sensor. Other impairments of the capture state which may be present, for example, on account of environmental influences such as the temperature or weather situation also result in relevant categorizations. Since it is also known that capture devices can be installed at different positions and therefore locations on the vehicle, for example on a front bumper or on a rear bumper or on side regions or on the windscreen or on the rear window, different types of functions also result therefrom. It is likewise additionally or alternatively possible for the capture direction and therefore the orientation of the capture region of a capture device relative to the vehicle to be different. The capture region of capture devices can therefore be oriented forwards or backwards with respect to a longitudinal axis of the vehicle. An orientation to the side is also possible. This also makes it possible to produce different types of functions in this regard. On account of these different constellations relating to the types of functions, capture devices of only one type of function are not suitable, for capturing all conditions in such a training scenario and therefore an environment completely and in the best possible manner. The proposed method counteracts these restrictions and a more individual training method is provided as a result.

The localization, as mentioned above, can therefore be carried out using different capture devices. In particular, however, depending on specific driving situations during the training drive, on the one hand, and the subsequent drive, on the other hand, information is only taken into account, in particular primarily, from very specific respective capture devices in order to be able to assess whether or not the trajectory is updated.

An aspect which is therefore also advantageous in that context is the fact that, during the different drives, namely the training drive, on the one hand, and the at least one subsequent drive, on the other hand, different information from different capture devices is then taken into account depending on individual conditions during these individual drives in order to then also actually perform the updating which possibly needs to be performed.

One advantageous embodiment may provide for the environment to be at least occasionally captured both using the first capture device and using the second capture device, in particular during the subsequent drive. In particular, capture can be at least occasionally carried out at the same time in this case using the first capture device and the second capture device. In particular, identical and/or different environmental regions of the environment are at least occasionally captured at the same time using two capture devices which differ in terms of the type of function. This then also makes it possible to compare the captured information. If capture is carried out only using the second capture device during the subsequent drive in one possible embodiment, there is no localization since the first capture device is not used for capture or the information from the first capture device is not taken into account. In particular, during this performance of the subsequent drive, this subsequent drive is carried out on the basis of the odometry information from the motor vehicle.

Provision is advantageously made for the training drive and the subsequent drive to differ in terms of at least one condition. This may be a condition of the vehicle itself. This condition may be a parameter describing the state of the vehicle. In particular, this parameter describing a driving state may be a movement parameter of the vehicle. In particular, at least one such vehicle-specific parameter, in particular a movement parameter, is therefore taken as a basis for deciding on the selection of information which is taken into account during the respective drive for assessing the trajectory and therefore also a possibly required update of the trajectory. In particular, that specific capture device whose information is taken as a basis for this assessment of the trajectory and/or a possibly required update of the trajectory is therefore selected on the basis of, in particular, this at least one vehicle-specific parameter, in particular the movement parameter. The different conditions during the training drive and the at least one subsequent drive are therefore individually examined in order to be able to assess the trajectory in an even more accurate manner in this respect.

At least one condition is therefore generally taken as a basis for deciding which information from which of the two capture devices is used during which drive. This at least one condition is taken as a basis for deciding that information from one of the two capture devices is taken as a basis for determining the trajectory during the training drive and, in particular, the information from the other capture device is not used or is used only with lower priority. During the subsequent drive, at least one condition stating that information from the other capture device is taken as a basis, in particular, is then taken as a basis for deciding whether or not the trajectory is intended to be updated. In particular, the information from the capture device whose information was taken as a basis for determining the trajectory during the training drive is not used or is used only with lower priority in this case.

A condition may be a vehicle-specific condition, for example a speed or a steering angle or an orientation of the vehicle in the environment, or an environmental condition, for example a temperature, humidity, precipitation, etc., or a capture-device-specific condition such as a type of capture or a capture state or a position on the vehicle or an orientation of the capture region with respect to the vehicle and/or with respect to objects in the environment.

Provision is advantageously made for the vehicle to drive at a first speed as a vehicle-specific condition during a training drive and to drive at a second speed which differs from the first speed during the subsequent drive. The speed is, in particular, an example of a movement parameter of the vehicle. The movement of the vehicle at different speeds during the training drive and the subsequent drive can be performed intentionally or unintentionally. Since the different capture devices function in a better or worse manner at different speeds, in particular on account of their type of capture and/or position on the vehicle and/or the orientation of the capture region, the proposed method can be used to take these limitations of the different capture devices into account in the best possible manner. Since specific types of functions of capture devices are limited with respect to the capture accuracy at specific speeds, in particular higher speeds, the proposed method therefore also makes it possible take the respective speed of the vehicle during the different drives as a basis for deciding which capture device is then more suitable and provides more accurate information relating to the environment and therefore the localization of the vehicle, with the result that, in that context, the most suitable information from the most suitable capture device is also used in line with requirements.

Provision is preferably made for the first speed to be adapted to the recording property and therefore the type of capture and/or position on the vehicle and/or the orientation of the capture region of the first capture device and for the second speed to be adapted to the relevant recording property of the second capture device. In this advantageous embodiment, the speed during the different drives is therefore specifically individually adjusted in such a manner that it takes into account, in the best possible manner, the capture devices which are then also desired and are then intended to respectively provide usable information.

Provision is preferably made for the first speed to be greater than or equal to 30 km/h. This enables a training scenario in which the training drive can also take place at relatively high speeds. The training scenario therefore becomes closer to reality in terms of the actual movement behaviour of a motor vehicle, with the result that the conventional movement behaviour of a motor vehicle can be modelled and restrictions therefore need no longer be accepted in that context Particularly at these relatively high speeds which may also be up to 40 km/h and greater, for example, the accuracy with which the environment is captured, in particular specific objects in the environment which then form the basis for localization however, can decrease for specific types of functions. In order to then again use the respectively suitable capture devices in line with requirements here and to use their information to determine the trajectory and possibly carry out an update, the method proposed above is used. The desired information capture accuracy is therefore then also achieved for subsequent drives or so-called repeat manoeuvres. This is advantageous, in particular, when not only a single subsequent drive is intended to be performed, but rather a plurality of subsequent drives are carried out.

In particular, provision is made for the second speed to be less than 30 km/h. It is therefore proposed that the vehicle moves at a lower speed during the at least one subsequent drive than during the training drive. This improves the accuracy of the repeat manoeuvre. Renewed recording and updating of the training data obtained during the training drive are improved as a result. Additional information from capture devices relating to object detection along the recorded manoeuvre can also be used to then also verify the position of the path or the trajectory. Provision may preferably be made, during the subsequent drive, for information to be generated by an ultrasonic sensor as the second capture device and/or a camera, which is arranged on a longitudinal side of the vehicle and whose capture region is oriented to the side, and to be taken into account for updating the trajectory. Since these specific types of capture devices and/or their orientation, in particular, enable only limited capture of the environment, in particular of the environmental regions to the side of the vehicle, at higher speeds of the vehicle, it is therefore particularly advantageous if theft information is taken as a basis during the subsequent drive at a lower speed since these detection devices enable high detection precision under these conditions of the subsequent drive.

Provision is preferably made, during the training drive, for information to be generated by an optical sensor and/or a radar sensor as the first capture device and to be taken into account for determining the trajectory. Additionally or alternatively, it is also possible to use, in particular, capture devices whose capture regions are oriented forwards and/or backwards in the longitudinal direction of the vehicle. Since a corresponding capture accuracy is also enabled at higher speeds with respect to this configuration, this is advantageous during the training drive at a higher speed, in particular.

Environmental conditions and/or vehicle-specific conditions can be advantageously taken into account during the subsequent drive. These conditions are taken as a basis for deciding whether information generated using the at least second capture device during the subsequent drive is taken into account for updating the trajectory. The training scenario is therefore carried out in an even more accurate manner and more in line with requirements. In that context, a temperature and/or a weather condition and/or a season and/or a time of day can be taken into account as environmental conditions, and/or an inclination of the road on which the vehicle is moving can be taken into account. On account of these influences as well, individual capture devices are more or less suitable for providing accurate information depending on the situation. The training scenario is improved by this additional decision-making criterion of whether their captured information is then taken into account for determining the trajectory and, in particular, for updating a trajectory.

In addition, a capture-device-specific parameter can also be taken into account in order to decide whether the information which is then captured is intended to be taken into account. For example, this may be the light quality in the case of a camera. Soiling of the capture device may also be taken into account. An at least reduced functionality of the capture device may possibly arise in the case of soiling. These conditions can therefore then also be taken as a basis for deciding whether or not the information obtained from the respective capture devices actually contributes to improving the training scenario.

Provision is advantageously made for the information generated by the selected, in particular at least second, capture device during the subsequent drive to be assessed by a vehicle user and, on the basis thereof, for the vehicle user to decide whether this information is taken into account for updating the trajectory. The quality of the trajectory being driven along is therefore confirmed, for example, by the driver by means of an input for an input unit of an electronic vehicle guidance system. This makes it possible to use only good-quality manoeuvres to improve the recording data and therefore also the trajectory determined during the training drive. The training effect of the electronic vehicle guidance system can be improved and optimized more quickly as a result.

The trajectory is preferably updated if there is a deviation between the trajectory and a subsequent trajectory driven along during the subsequent drive. In particular, an update is carried out if there is a deviation that is greater than a tolerance value of the target position in the parking area for the trajectory from the target position in the parking area for the subsequent trajectory. In this embodiment, a comparison is therefore carried out, in particular, with respect to the target position which is reached in each case, and the information obtained in the training scenario is updated on the basis thereof.

The at least one subsequent drive is preferably carried out at least in a semi-autonomous manner, in particular in a fully autonomous manner.

A further independent aspect of the invention relates to a method for training a trajectory for a vehicle, along which the vehicle drives into a parking area at least in a semi-autonomous manner, wherein, during a training drive, the environment of the vehicle is captured using at least one first capture device of the vehicle, and the trajectory is determined on the basis thereof, in particular wherein the first capture device constitutes a first type of function, which differs from a second type of function of a second capture device of the vehicle, with respect to the type of capture and/or a capture state and/or the position on the vehicle and/or the orientation on the vehicle, wherein, during the training drive, at least one condition, in particular at least one vehicle-specific condition and/or an environmental condition and/or a capture-device-specific condition, is at least taken as a basis for deciding whether the trajectory is determined on the basis of the information from the first capture device or on the basis of the information from the second capture device, and, during a subsequent drive which follows the training drive and in which the vehicle drives to at least certain regions of the parking area, at least one condition, in particular the above-mentioned condition, in particular at least one vehicle-specific condition and/or an environmental condition and/or a capture-device-specific condition, is taken as a basis for deciding whether, in particular that, the information from the second capture device should be taken as a basis for an assessment and whether the trajectory is updated on the basis of this information.

In particular, the training drive is characterized or carried out with at least one value of at least one condition which differs from the value during the subsequent drive, wherein this at least one condition or the values is/are taken as a basis for deciding which information from which capture device is taken into account during which of the respective drives. In particular, the trajectory is determined at least primarily and/or mainly, in particular only, on the basis of the information from the first capture device and a potential update of the trajectory is assessed at least primarily and/or mainly, in particular only, on the basis of the different information from the second capture device.

Embodiments of the first independent aspect of the invention are to be considered advantageous embodiments of the further independent aspect.

A further aspect of the invention relates to an electronic vehicle guidance system for a vehicle, having at least one first capture device and at least one second capture device and an evaluation unit. The electronic vehicle guidance system is designed to carry out a method according to the above-mentioned aspect or an advantageous configuration thereof. In particular, this method is carried out using the electronic vehicle guidance system.

A further aspect of the invention relates to a vehicle, in particular a motor vehicle, having an electronic vehicle guidance system according to the above-mentioned aspect.

Exemplary embodiments of the invention are explained in more detail below with reference to schematic drawings of a FIGURE. In the drawings:

The single FIGURE shows an exemplary plan view of an environment having a parking area and a vehicle which moves into the parking area.

The FIGURE shows a road 1 which is adjoined by a plot of land 2, for example. A parking area P, which may be a home parking area, is formed on this plot of land 2. The parking area P remains permanently the same in terms of its position and orientation on the plot of land 2.

A vehicle 3, which is a motor vehicle here, branches off from the road 1 and drives to the parking area P in order to park there. In order to reach the parking area P, the vehicle 3 drives into the plot of land 2 via an entrance 4 which is likewise stationary and remains permanently the same. In order to therefore obtain a movement path which remains as constant as possible between the entrance 4 and the parking area P, provision is preferably made to train this movement path of the vehicle 3, with the result that it is driven along as accurately as possible and therefore also without errors, in particular if the vehicle 3 moves in a fully autonomous manner from the entrance 4 to the parking area P.

The vehicle 3 has an electronic vehicle guidance system 5. At least semi-autonomous operation, in particular fully autonomous operation, of the vehicle 3 can be carried out using this vehicle guidance system. The electronic vehicle guidance system 5 has a capture apparatus 6 which may have a plurality of and therefore at least two capture devices. The capture apparatus 6 has at least two capture devices which differ in terms of the type of function. With regard to the type of function, it is possible to define a difference of the capture devices by means of the type of capture of the capture devices and/or a capture state of the capture devices and/or a position of the capture devices on the vehicle 3 and/or an orientation of a capture region of the capture devices on the vehicle 3. The capture apparatus 6 has, for example, a capture device 7 which is arranged in a front region of the vehicle 3 and/or in a rear region of the vehicle 3 and/or whose capture region is oriented forwards and/or backwards in the direction of a longitudinal axis of the vehicle 3. This capture device 7 may be a first capture device 7, for example. Additionally or alternatively, the vehicle 3 may have a capture device 8. The capture device 8 may be arranged, for example, in the interior of the vehicle 3, for example in the upper region of the windscreen of the vehicle 3 and/or in the upper region of a rear window of the vehicle 3. The capture region of this capture device 8 can be advantageously oriented forwards and/or backwards in the longitudinal direction of the vehicle 3. This capture device 8 may be a first capture device.

The vehicle 3 may also have a capture device 9 which is arranged on opposite longitudinal sides of the vehicle 3. In particular, the capture regions of these capture devices 9 are oriented to the side and/or obliquely backwards when viewed with respect to the longitudinal axis of the vehicle 3. This capture device 9 may be a second capture device, for example.

The capture devices may differ in terms of their type of capture and may be, for example, ultrasonic sensors or radar sensors or lidar sensors or cameras. The vehicle 3 preferably has a plurality of capture devices which differ in terms of the type of capture. For example, the capture device 7 can be equipped with one or more ultrasonic sensors or with one or more radar sensors and/or with one or more lidar sensors. The capture device 8 may be equipped with cameras, for example. The capture device 9 may be equipped with cameras.

In order to now be able to train the movement path of the vehicle 3, in particular starting from the entrance 4 to the parking area P, the vehicle 3 is moved to the parking area P starting from an advantageous starting point 10 during a first training drive. In particular, this training drive can be carried out in a completely manual manner by a vehicle driver of the vehicle 3. However, the vehicle 3 may also be moved in a semi-autonomous manner, for example. During this training drive, an environment 11 of the vehicle 3 is captured by a first capture device formed, for example, by the capture devices 7 and/or 8. In particular, this training drive is carried out at a speed of the vehicle 3 of greater than 30 km/h, for example also greater than or equal to 40 km/h. During this training drive, information from that capture device, in particular from the first capture device 7 and/or 8, is then used to be able to capture and accordingly provide suitable information relating to the environment 11 under these conditions of the vehicle 3 during the training drive. In particular, those capture devices which provide the best possible information on the basis of this at least one vehicle-specific parameter, in particular the movement condition, in particular the specific speed, are therefore used to provide information for determining the trajectory. In the case of the capture device 9 for example, this is not possible or is possible only to a limited extent under these conditions since the capture regions of this capture device 9 are oriented to the side and the lateral environment can therefore be captured only to a limited extent using these cameras at this relatively high speed of the vehicle 3. In particular, the electronic vehicle guidance system 5 therefore decides that, on account of the speed of the vehicle 3 and/or the orientation of the capture device 9 with respect to the movement direction of the vehicle 3, the information captured by the capture device 9 during, the training drive is not taken into account in order to determine the trajectory and therefore to determine the localization of the vehicle 3 with respect to the environment 11.

Additionally or alternatively, it is then also possible to take into account what a capture state of a capture device 7, 8, 9 is like. Additionally or alternatively, the position on the vehicle 3 and/or the orientation of the capture region of the capture device 7, 8, 9 can then also be taken into account in order to decide, on the system side, which information captured by which capture devices is used to determine the trajectory 12 which is driven along during the training drive. The electronic vehicle guidance system 5 therefore provides, in particular, an intelligent system which takes at least one condition as a basis for deciding which information from which capture devices is used during the training drive to determine the trajectory 12. In that context, environmental conditions, for example the temperature and/or a weather situation, can additionally also be used to decide whether the captured information is used to determine the trajectory 12.

In the example shown in the FIGURE, which should not be understood as being conclusive however, the intention is therefore to show that, as a result of the relatively limited capture region of the capture devices 9 which are in the form of cameras, in particular, these devices are suitable only to a limited extent or are not suitable for recording at relatively high speeds and their information therefore is not used to determine the trajectory 12.

Therefore, the capture devices 7 and 8 are better suited on account of the position and/or orientation of the capture regions, in particular when their capture state is not impaired and there is therefore, for example, no soiling of a lens and/or a diaphragm and/or a radar sensor which would impair the capture function. This can preferably be checked.

During a subsequent drive which then follows the training drive or a repeat manoeuvre in which the vehicle 3 drives off from the starting point 10 again and drives to the parking area P, in particular at least in a semi-autonomous manner, preferably in a fully autonomous manner, this movement is carried out during the at least one subsequent drive with a condition that differs from the training drive. In particular, the vehicle 3 is moved on here at a second speed which differs from the first speed during the training drive. The second speed is preferably less than the first speed, in particular less than 30 km/h. At such a low speed, it is then possible for additional features in the direct vicinity to the side of the vehicle 3 to then also be able to be accurately captured, for example kerbs, lines, the edge of a lawn and the like, which is then enabled by the capture device 9 which then constitutes a second capture device. Since the capture regions of the capture devices 7 and 8 are oriented in a different direction, it is not then suitably possible or is suitably possible only to a limited extent to use these capture devices 7, 8 to capture objects which are directly beside and close to the vehicle 3 on the left-hand and right-hand sides. This is then enabled by the capture device 9. It is therefore possible, in particular during the subsequent drive and, in particular, also on account of the orientation of the capture regions of the capture device 9 and on account of the reduced speed of the vehicle 3, to also accurately capture these environmental regions which are then in the immediate vicinity of and to the side of the vehicle 3. During this at least one subsequent drive, this information from the second capture device 9, in particular, is then taken into account in order to assess whether the trajectory 12 driven along during the training drive is updated. As can be seen in the FIGURE, the vehicle 3 drives along a subsequent trajectory 13, which deviates from the trajectory 12 in the example, in the subsequent drive. In particular, it can also be seen here, by way of example, that a target position of the vehicle 3 in the parking area P, and therefore an end position, during the training drive deviates from the end position during the subsequent drive. In that context, the end position of the vehicle 3 during the training drive is illustrated using dashed lines.

The data during the training drive, and therefore the trajectory 12, are updated, in particular, when there is a deviation between the trajectory 12 and the subsequent trajectory 13, in particular a deviation of greater than a tolerance value. A tolerance value may be formed, for example, by the distance between the trajectories 12, 13 and/or the number of intersection points of the trajectories 12, 13 and/or the curvatures of the trajectories 12, 13. In particular, an update is performed when there is a deviation of the end position of the vehicle 3 in the parking area P for the trajectory 12 from the end position in the parking area P for the subsequent trajectory 13. Particularly during the at least one subsequent drive which is carried out under at least one defined condition that differs from the training drive, in particular is carried out at a reduced speed, the distances between the vehicle 3 and static objects in the environment 11, which are also particularly close to the vehicle 3, can be recorded in an improved manner, for example also by means of ultrasonic sensors, in particular.

The information can be stored in an environmental map. The object data for trajectory improvement and object-dependent speed profiles, for example, can also be stored there.

This scenario also makes it possible to capture frequent changes of features and therefore objects in the environment 11 in an improved manner, as is the case with a meandering avenue, for example. This can be captured in an improved manner at lower speeds of the vehicle 3 since, in that context, a very high object density can be captured with increased accuracy.

Provision may also be made for a vehicle user to decide whether the information captured during the subsequent drive, in particular, is intended to be taken into account for updating the trajectory 12. This can be carried out, for example, by means of an input to an input unit 14 of the vehicle 3.

The invention claimed is:

1. A method for training a trajectory for a vehicle, along which the vehicle drives into a parking area, the method comprising:

during a training drive at a first speed carried out manually by a driver, capturing a first set of information related to an environment of the vehicle using a first capture device of an electronic vehicle guidance system installed at a first position on the vehicle for capturing a first orientation of a first capture region relative to the vehicle, wherein the first capture device is one of an ultrasonic sensor, a radar sensor, or an optical sensor; and determining a first trajectory for the vehicle on the basis of the first set of information; and during one or more subsequent drives carried out in an at least semi-autonomous manner at a lower speed than the first speed which follows the training drive and in which the vehicle drives to at least certain regions of the parking area, capturing an additional set of information related to the environment using a second capture device of the electronic vehicle guidance system installed at a second position on the vehicle for capturing a second orientation of a second capture region relative to the vehicle that is different from the first orientation, wherein the second capture device is one of an ultrasonic sensor, a radar sensor, or an optical sensor;

determining an updated trajectory that is more accurate than the first trajectory on the basis of the additional set of information;

causing the vehicle to drive the updated trajectory; and confirming a quality of the updated trajectory being driven, such that only trajectories confirmed are used to train the trajectory for the vehicle.

2. The method according to claim 1, wherein the first speed is adapted to a detection property of the first capture device and the lower speed is adapted to a detection property of the second capture device.

3. The method according to claim 1, wherein the first speed is greater than or equal to 30 km/h.

4. The method according to claim 1, wherein the lower speed is less than 30 km/h.

5. The method according to claim 4, wherein the additional set of information is generated by an ultrasonic sensor or a camera arranged on a longitudinal side of the vehicle.

6. The method according to claim 1, wherein the first set of information is generated by an optical sensor or a radar sensor.

7. The method according to claim 1, wherein a vehicle user provides a confirmation by an input to an input unit of the electronic vehicle guidance system of the vehicle.

* * * * *